United States Patent [19]
Chronister

[11] Patent Number: 6,138,985
[45] Date of Patent: Oct. 31, 2000

[54] INTERNAL TANK CAR VALVE WITH SAFETY LOCK AND INTERLOCKING LUG

[76] Inventor: Clyde H. Chronister, 6830 Champions Plaza Dr. #733, Houston, Tex. 77069

[21] Appl. No.: 09/412,213

[22] Filed: Oct. 5, 1999

[51] Int. Cl.$^7$ .................................................. F16K 35/00
[52] U.S. Cl. .......................... 251/93; 251/111; 251/144; 137/797
[58] Field of Search ............................... 251/144, 90, 92, 251/93, 95, 98, 101, 111, 112, 113; 137/797

[56] References Cited

U.S. PATENT DOCUMENTS

| | | | |
|---|---|---|---|
| 1,491,077 | 4/1924 | Beerworth | 251/293 |
| 1,609,879 | 12/1926 | Messmer | 251/263 |
| 1,779,750 | 10/1930 | Oldham | 251/86 |
| 2,384,787 | 9/1945 | Baker et al. | 137/139 |
| 2,470,700 | 5/1949 | Henry | 251/46 |
| 2,848,187 | 8/1958 | Henry | 251/85 |
| 3,065,950 | 11/1962 | Goldberg | 251/160 |
| 3,182,951 | 5/1965 | Spencer | 251/85 |
| 3,531,083 | 9/1970 | Rohrer | 251/188 |
| 3,963,211 | 6/1976 | Myers | 251/85 |
| 3,981,481 | 9/1976 | Reedy et al. | 251/144 |
| 4,073,469 | 2/1978 | Kodric | 251/86 |
| 4,121,614 | 10/1978 | Reedy | 137/382.5 |
| 4,137,935 | 2/1979 | Snowdon | 137/242 |
| 4,161,958 | 7/1979 | Behle | 137/316 |
| 4,180,242 | 12/1979 | Reedy | 251/144 |
| 4,194,523 | 3/1980 | Lubieniecki | 137/238 |
| 4,212,447 | 7/1980 | Behle | 251/98 |
| 4,220,097 | 9/1980 | Wempe et al. | 105/360 |
| 4,408,627 | 10/1983 | Harris | 137/242 |
| 4,440,379 | 4/1984 | Behle et al. | 251/144 |
| 4,586,538 | 5/1986 | Niskanen | 137/625.5 |
| 4,890,814 | 1/1990 | Thomas | 251/95 |
| 5,042,776 | 8/1991 | Chronister | 251/144 |
| 5,145,151 | 9/1992 | Chronister | 251/144 |
| 5,170,988 | 12/1992 | Chronister | 251/144 |
| 5,209,456 | 5/1993 | Chronister | 251/144 |
| 5,213,308 | 5/1993 | Jeromson et al. | 251/95 |
| 5,342,026 | 8/1994 | Dean | 251/85 |
| 5,487,493 | 1/1996 | McNabb | 251/90 |
| 5,931,444 | 8/1999 | Chronister | 251/111 |

FOREIGN PATENT DOCUMENTS

| | | | |
|---|---|---|---|
| 0 021 885 | 1/1981 | European Pat. Off. | 251/98 |
| 2 258 136 | 6/1993 | Germany | 251/95 |

OTHER PUBLICATIONS

"Installation, Operating and Maintenance Instructions," Midland Bottom Outlet Valves, Midland Manufacturing Corporation, Oct. 31, 1987.

*Primary Examiner*—Kevin Shaver
*Assistant Examiner*—Eric Keasel
*Attorney, Agent, or Firm*—Akin, Gump, Strauss, Hauer & Feld, LLP

[57] ABSTRACT

A valve assembly having a body assembly mounted to a vessel opening. The body assembly includes a valve seat and a valve throughbore. A valve disk co-acts with the valve seat for opening and closing the valve throughbore. A receiver member having a receiver portion extends from the valve disk. A lock member is mounted in the body assembly and is capable of being received in the receiver portion to lock the valve disk in a locked position restricting movement of the valve disk relative to the valve seat. A valve operator assembly is in cooperative relationship with the valve disk and is capable of forcing the valve disk away from the valve seat to open the valve throughbore when the lock member is in an unlocked position. An interlock lug is attached to the valve operator assembly and prevents movement of the valve operator assembly when the lock member is in the locked position.

12 Claims, 4 Drawing Sheets

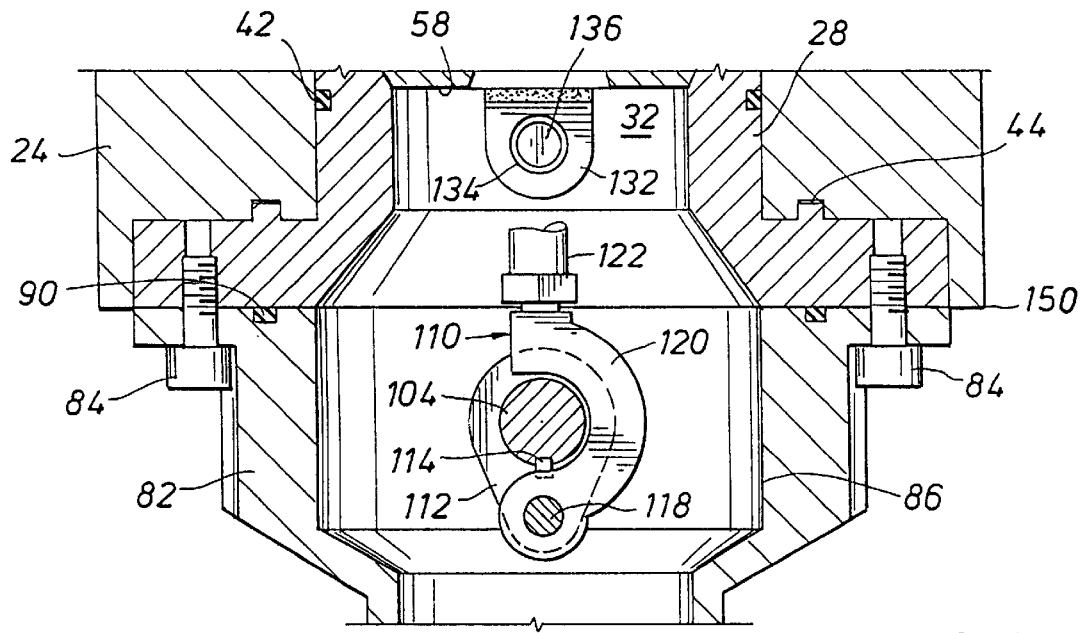
FIG. 2
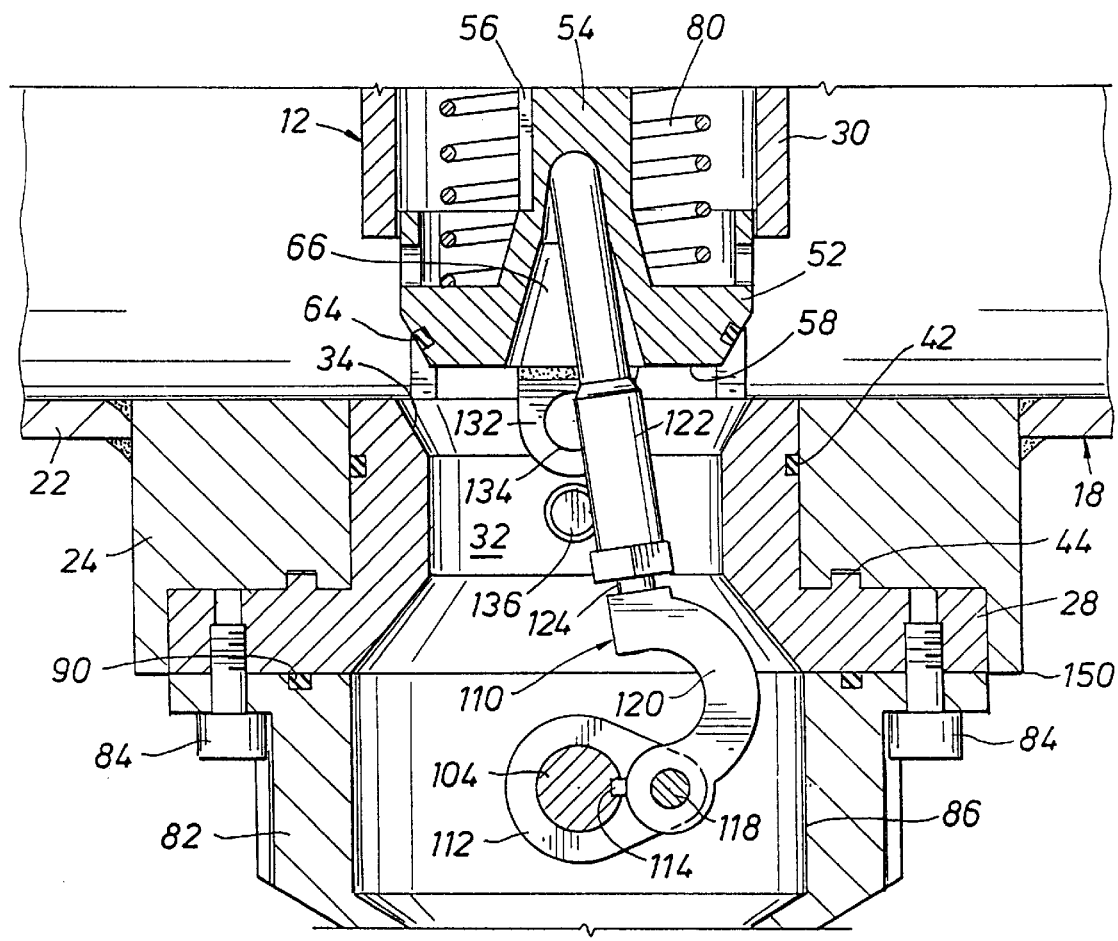

INTERNAL TANK CAR VALVE WITH SAFETY LOCK AND INTERLOCKING LUG

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to internal valves for tanks, and more specifically refers to internal valves with locks for use in mobile tank cars.

2. Description of the Related Art

Tank valves are used for loading or unloading tanks, including railroad tank cars, truck tanks, stationary tanks, or other types of tanks used to contain liquids, gasses, or slurries. Applicant's U.S. Pat. No. 5,042,776 discloses an internal tank valve. The internal tank valve is positioned internally of the tank and is therefore less susceptible to damage, particularly in the event of a derailment or other accident involving a mobile tank. The internal tank valve disclosed in the '776 patent can be conveniently installed from the exterior of the tank, and easily removed for repair or replacement. The operator for the internal tank valve is also located internally of the tank.

Railroad tank cars and truck tanks are notoriously subjected to vibrations and shocks. Applicant's U.S. Pat. No. 5,145,151 discloses an internal tank valve with a valve lock to increase the safety factor of the valve. The internal tank valve of the '151 patent includes a primary seal which can be more securely locked in the closed position to assure a positive seal, a fire safe valve, and reduces the likelihood of spillage of material from inside of the tank in the event of a derailment or accident of the tank car. The locking structure is provided at a location that allows the valve to be held in a closed positive sealing position in the event of an accident in which part of the valve that protrudes and cap may be sheared off.

Applicant's U.S. Pat. No. 5,170,988 discloses an internal tank valve that is a cam actuated, quick acting, self-locking valve which reduces the possibility of the tank valve being opened due to shocks or vibration.

U.S. Pat. No. 5,342,026 discloses a valve having a cam actuator for opening and closing the valve. The cam actuator is directly coupled to a valve disk with a resilient coupling assembly.

Applicant's U.S. Pat. No. 5,931,444 discloses an internal tank valve having a safety lock for securely locking the valve in the closed position. The valve also includes a shear plane that allows the outer portion of the valve to be sheared off without affecting the integrity of the safety lock.

It is desirable to have an internal tank valve with a safety lock and interlock mechanism that is simple, reliable, safe, economical, and inherently protected against mechanical failure.

SUMMARY OF THE INVENTION

The present invention is an internal tank valve with a safety lock and interlock mechanism that is simple, reliable, safe, economical, and inherently protected against mechanical failure.

The internal tank valve assembly is for a tank having an opening. The valve assembly includes a body assembly mounted to the tank opening. The body assembly has a valve seat and a valve throughbore. A valve disk co-acts with the valve seat for opening and closing the valve throughbore. A locking lug is attached to the valve disk. The locking lug has a locking portion for receiving a safety lock pin mounted in the body assembly. The safety lock pin has a locked position and an unlocked position. The safety lock pin is received in the locking portion of the locking lug to lock the valve disk in the locked position, and the safety lock pin is withdrawn from the locking portion in the unlocked position. A valve operator is in cooperating relationship with the valve disk. The valve operator forces the valve disk away from the valve seat to open the valve throughbore. An interlock lug prevents movement of the valve operator when the valve disk is in the locked position.

The body assembly includes a first member and a second member. In one embodiment of the present invention, the lock pin is mounted in the first member and the valve operator is mounted in the second member. A shear plane is formed between the first and second members such that the second member and valve operator may be sheared from the first member at the shear plane without affecting the integrity of the lock pin in the locked position.

BRIEF DESCRIPTION OF THE DRAWINGS

In order to more fully understand the drawings referred to in the detailed description of the present invention, a brief description of each drawing is presented, in which:

FIG. 2 is a side elevational view, in section, of the valve operator of FIG. 1 with the valve shown in the closed and locked position;

FIG. 3 is a partial side elevational view, in section, of the internal tank valve with safety lock of FIG. 1, the internal tank valve with safety lock in an open and unlocked position;

DETAILED DESCRIPTION OF INVENTION

Figure 1:
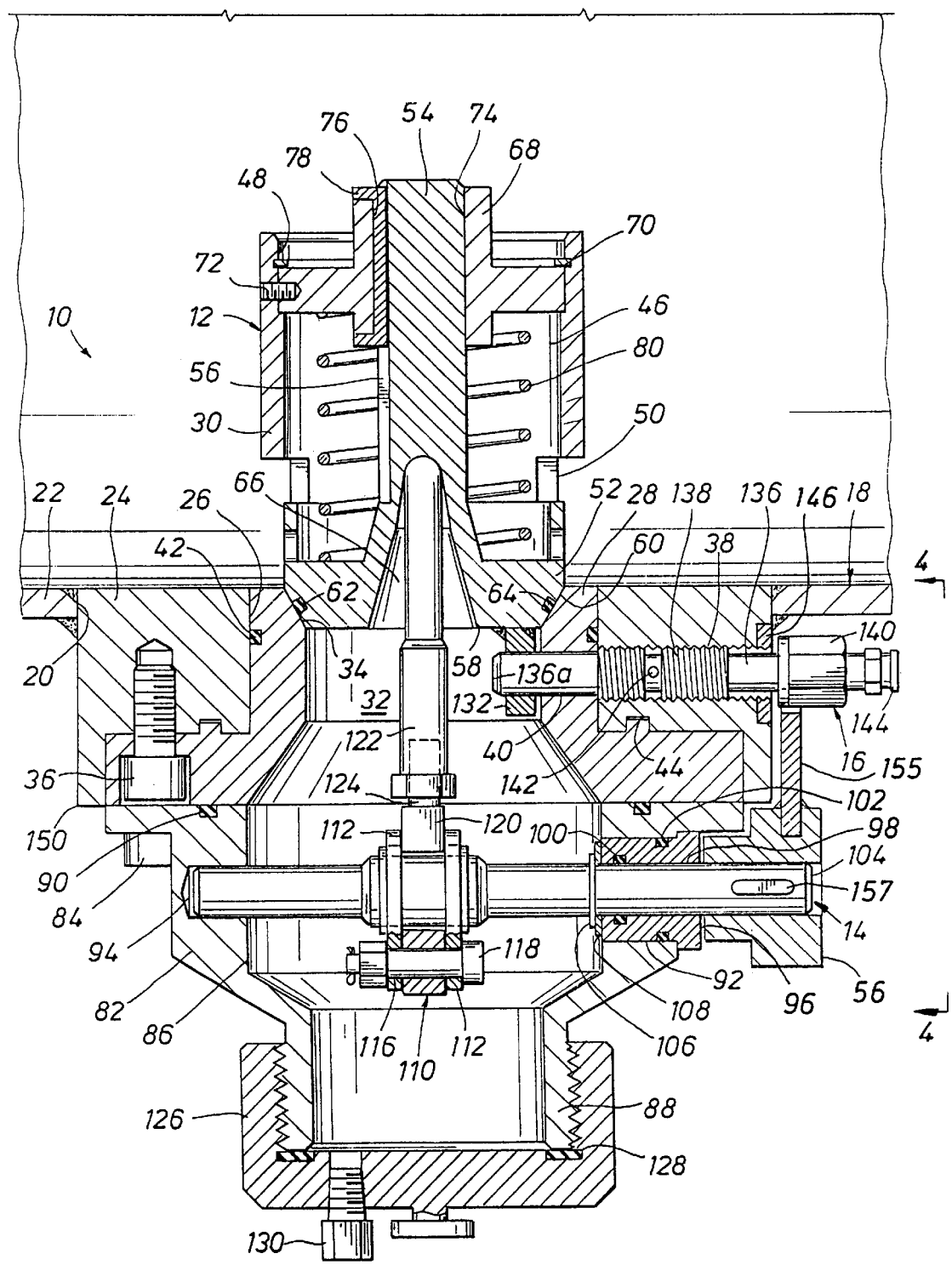
FIG. 1 is a sectional, elevational view of a first embodiment of the internal tank valve with safety lock and interlock mechanism, the internal tank valve with safety lock and interlock mechanism mounted in the bottom of a tank and having a lower valve operator, the internal tank valve with safety lock shown in a closed and locked position.

Referring now to the drawings in greater detail, the internal tank car valve with safety lock and interlock mechanism, or the tank valve assembly, is generally referred to as 10. FIGS. 1–4 show a first embodiment of the tank valve assembly 10 mounted in the bottom of a tank 18. Although not shown, it is to be understood that the bottom-mounted tank valve assembly 10 of FIGS. 1–4 can also be inverted and installed as a top-mounted tank valve assembly 10. Applicant incorporates by reference Applicant's U.S. Pat. No. 5,931,444 in its entirety.

The tank valve assembly 10 includes a main valve generally indicated as 12, a valve operator generally indicated as 14, a safety lock generally indicated as 16, and an interlocking lug 155. The features of the safety lock 16 and interlocking lug 155 are operational in both the top-mount and bottom-mount tank valve assemblies 10 and may also be used with various types of valve operators 14. The main valve 12 is adapted to be installed inside of a mobile tank 18, as for example a railroad tank car. However, the internal tank car valve with safety lock 10 and interlocking lug 155 can be installed in other and various types of tanks.

One embodiment of the tank valve assembly 10 will be described in detail with specific reference to FIGS. 1–4. Referring to FIG. 1, the internal tank car valve with safety lock 10 and interlocking lug 155 is shown as a bottom tank valve 12 having a bottom operator 14. A hole 20 is cut in a vessel wall 22 of the tank 18. A mounting adapter 24 is welded to the vessel wall 22. The mounting adapter 24 includes a valve body receiving bore 26 allowing insertion and removal of a valve body 28 and a guide tube 30. The valve body 28 includes a lading throughbore 32. The valve body 28 includes a valve seat 34 at one end of the lading throughbore 32. Preferably, the valve body 28 is secured to the mounting adapter 24 with a plurality of threaded fasteners 36. The mounting adapter 24 includes a radial bore 38 extending from the outer surface of the mounting adapter 24 to the valve body receiving bore 26. The valve body 28 also includes a radial bore 40 adjacent and in axial alignment with the radial bore 38. Preferably, an O-ring seal 42 and a sealing gasket 44 are provided above and below the radial bores 38 and 40 forming seals between the valve body 28 and the mounting adapter 24 as shown in FIGS. 1–3.

Referring to FIG. 1, the guide tube 30 is connected, preferably by welding, to the valve body 28. The guide tube 30 includes a longitudinal bore 46 having a slightly enlarged diameter upper bore portion 48. The lower portion of the guide tube 30 includes a plurality of windows 50 through the wall of the guide tube 30.

A valve disk 52 includes an upper post 54, preferably cylindrical and including a longitudinal keyway 56. The valve disk 52 includes a lower face 58 intersecting with an outwardly tapering seal face 60. The seal face 60 preferably includes a seal ring groove 62 for receiving a seal ring 64. In this embodiment of the present invention, the valve disk 52 includes a blind bore 66, preferably inwardly tapered, in the lower face 58 as shown in FIGS. 1 and 3.

It is to be understood that the seal face 60 with the seal ring 64 corresponds to and abuts with the valve seat 34 of the valve body 28 when the main valve 12 is in the closed position. Alternatively, the seal ring groove 62 and seal ring 64 could be located in the valve seat 34 instead of the seal face 60.

Referring to FIG. 1, a guide body 68 has an outer diameter adapted to be received in the upper bore portion 48 of the guide tube 30. Preferably, a snap ring 70 secures the axial location of the guide body 68 relative to the guide tube 30. Preferably, the guide body 68 is prevented from rotating relative to the guide tube 30. One such means for accomplishing this is shown in FIG. 1 by fixing the angular orientation of the guide body 68 with a pin 72 extending through the wall of the guide tube 30 and into the guide body 68. The guide body 68 includes a central bore 74 having a longitudinal recess 76 for partially receiving an anti-rotation key 78. The anti-rotation key 78 is also partially received in the longitudinal keyway 56 in the upper post 54 of the valve disk 52. It is to be understood that the valve disk 52 is prevented from rotating relative to the valve body 28. A compression spring 80 is positioned around the upper post 54 and between the lower portion of the valve disk 52 and the guide body 68. The spring 80 applies a force to seat the valve disk 52 with the valve body 28 as shown in FIG. 1.

Referring to FIGS. 1–4, the valve operator 14 is mounted in a base member 82. Preferably, the base member 82 is secured to the valve body 28 with a plurality of threaded fasteners 84 as shown in FIGS. 2 and 3. The base member 82 includes a lading passageway 86 and a lading outlet 88. Preferably, an O-ring seal 90 is located around the lading passageway 86 and between the base member 82 and the valve body 28. Referring to FIG. 1, the base member 82 includes a radial throughbore 92 and a radial operator blind bore 94. The radial throughbore 92 and the radial operator blind bore 94 are axially aligned on opposite sides of the lading passageway 86. A sealing cartridge 96 having a radial operator throughbore 98 is received in the radial throughbore 92. The sealing cartridge 96 includes an inner O-ring seal 100 and an outer O-ring seal 102. The outer O-ring seal 102 seals with the radial throughbore 92 of the base member 82. The inner O-ring seal 100 seals with an operator shaft 104. As shown in FIG. 1, the operator shaft 104 extends through the sealing cartridge 96 and into the radial operator blind bore 94. Although not shown in the drawings, it is to be understood that the sealing cartridge 96 is secured to the base member 82 preferably with threaded fasteners. Preferably, the operator shaft 104 includes a snap ring 106 and washer 108 that serve to maintain the operator shaft 104 within the base member 82 as shown in FIG. 1.

An operator linkage assembly 110 is connected to the operator shaft 104. Referring to FIGS. 1–3, a pair of crank links 112 are secured to the operator shaft 104, preferably with a key 114 (FIGS. 2 and 3). The crank links 112 include a hole 116 for receiving a pin 118. A curved actuating link 120 is pivotally connected to the crank links 112 with the pin 118. A valve actuating pin 122 is connected to the curved actuating link 120. Preferably, the valve actuating pin 122 is connected to the curved actuating link 120 with a threaded stud 124. As shown in FIGS. 1 and 3, the valve actuating pin 122 extends into the inwardly tapered blind bore 66 of the valve disk 52.

Figure 6:
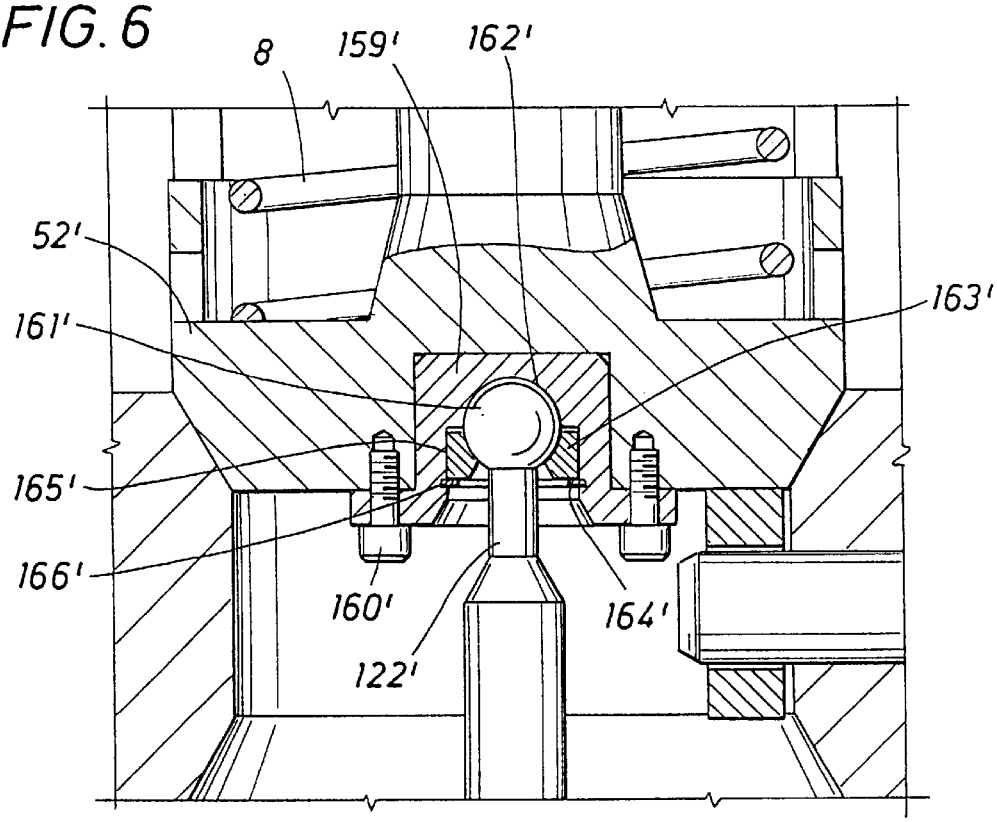
FIG. 6 is an enlarged view of the valve operator secured to the valve disk.
Figure 5:
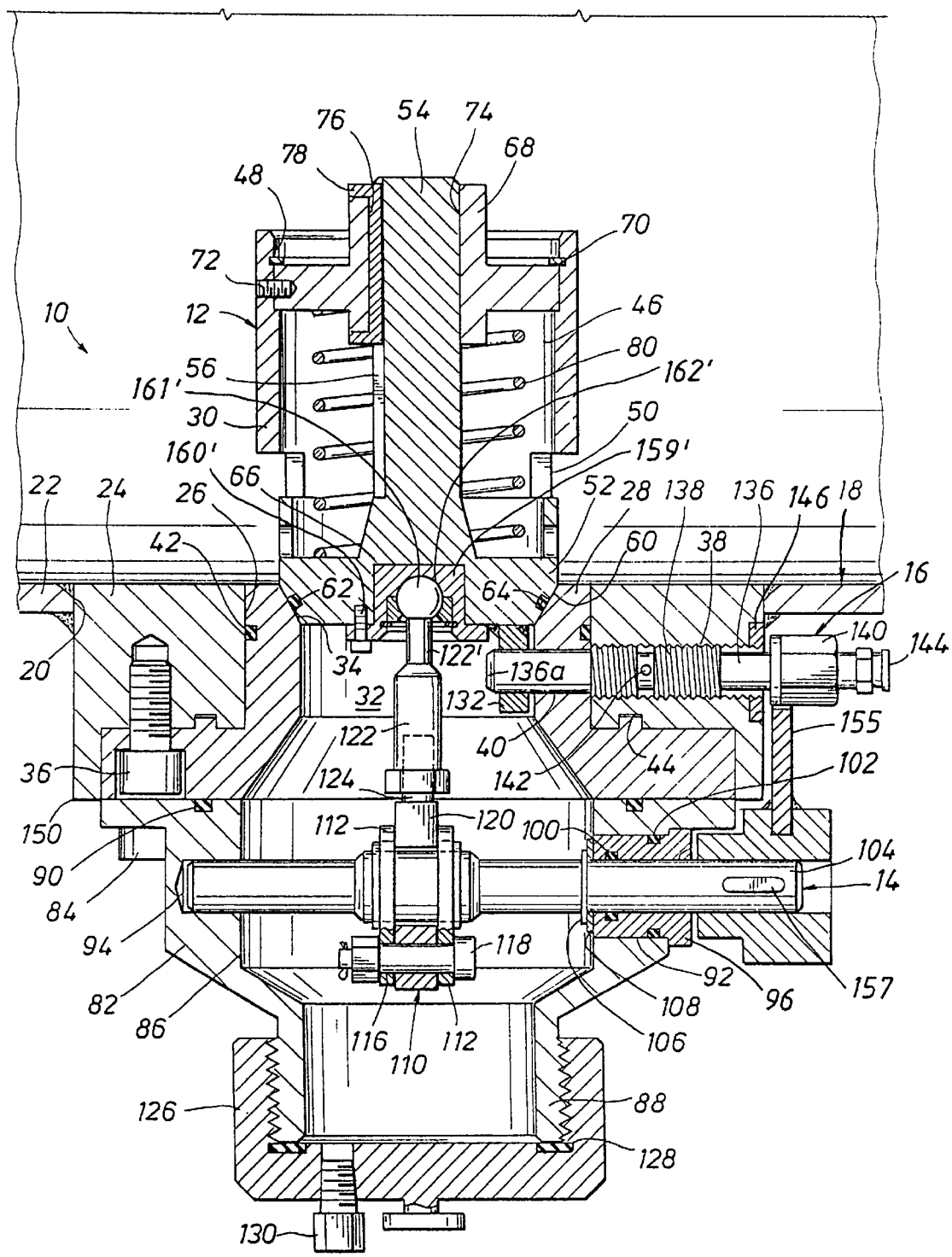
FIG. 5 is a sectional, elevational view of a second embodiment of the internal tank valve with safety lock and interlock mechanism, the internal tank valve having a valve operator secured to the valve disk.

An alternate embodiment for the operator linkage assembly shown in FIGS. 5 and 6 allows valve disk 52' to be retracted using valve operator 14, thus allowing valve disk 52' to seat in situations where the force from back-pressure from the tank exterior may exceed the force exerted by spring 80. In this embodiment, valve disk linkage assembly 159' is secured to valve disk 52' with a plurality of threaded fasteners 160'. Valve actuating pin 122', equipped with an enlarged end cap 161' (shown as a spherical cap in FIGS. 5 and 6), extends into socket 162' of valve disk linkage assembly 159'. Enlarged end cap 161' is secured in the assembly with split retainer 163' and retainer ring 164'. Preferably, split retainer 163' is manufactured in two pieces and fits snugly both around enlarged end cap 161' and inside the cylindrical recess 165' of valve disk linkage assembly 159'. Retainer ring 164', preferably a snap ring, snaps into groove 166' to secure split retainer 163' within socket 162'. Although FIGS. 5 and 6 show enlarged end cap 161' and socket 162' to use a spherical geometry fit, it is to be understood that a number of geometries or configurations can be employed to secure the actuation assembly to valve disk 52' in such a way that valve disk 52' can be both extended and retracted with the valve operator 14.

Referring again to FIGS. 5 and 6, it is to be understood that an embodiment may, but need not necessarily, incorporate spring 80. Because valve disk 52' is secured to operator linkage assembly 110', valve operator 14 may be used to supply axial force against valve disk 52' in either axial direction. Thus, the valve may be opened or closed using the valve operator 14.

Referring to FIG. 1, a shipping cap 126 is threadedly fastened to the lading outlet 88 of the base member 82. Preferably, a sealing gasket 128 is positioned within the shipping cap 126 to form a seal between the base member 82 and the shipping cap 126. Preferably, the shipping cap 126 includes a "tell tale" tap 130 that is threaded into the shipping cap 126. The tap 130 allows one to remove the tap 130 and check for any leakage past the valve disk 52 before removing the shipping cap 126. Referring to FIGS. 1–3, a locking lug 132 is secured, preferably by welding, to the lower face 58 of the valve disk 52. Alternatively, the locking lug 132 could be cast as part of the valve disk 52. The locking lug 132 includes a locking bore 134 for receiving a safety lock pin 136. Preferably, the locking bore 134 is a rounded hole slightly elongated along a horizontal axis. The slight horizontal elongation of the locking bore 134 accommodates slight rotation of the valve disk 52 resulting from the key and keyway connection 78, 56 of the valve disk 52 to the guide body 68. It is to be understood that the locking lug 132 can be an elongated sleeve or member having a locking bore 134 therein for receiving the safety lock pin 136. Alternatively, the locking lug 132 may have a locking slot or receiving portion for receiving the safety lock pin 136.

Referring to FIG. 1, the safety lock pin 136 preferably includes a threaded portion 138 that threadedly engages the radial bore 38 of the mounting adapter 24. The safety lock pin 136 includes an exterior head 140 to rotate the safety lock pin 136 to advance or retract the pin 136 relative to the locking lug 132 as will be explained below. The safety lock pin 136 preferably includes a beveled end 136a to facilitate the insertion of the pin 136 into the locking bore 134 of the locking lug 132. Preferably, the safety lock pin 136 includes a sealant groove 142 extending longitudinally through the safety lock pin 136 from the head 140 to approximately the center of the threaded portion 138 where it exits the pin 136 as shown in FIG. 1. A sealant fitting 144 connected to the pin head 140 allows a sealant to be injected into the sealant groove 142 with a sealant gun or wrench (not shown) to seal the threaded bore 38 of the mounting adapter 24 when in the locked position as shown in FIG. 1. A stop plate 146 is secured, preferably with threaded fasteners (not shown) to the exterior of the mounting adapter 24. The stop plate 146 provides a stop to prevent the safety lock pin 136 from being entirely removed from the mounting adapter 24.

Figure 4:
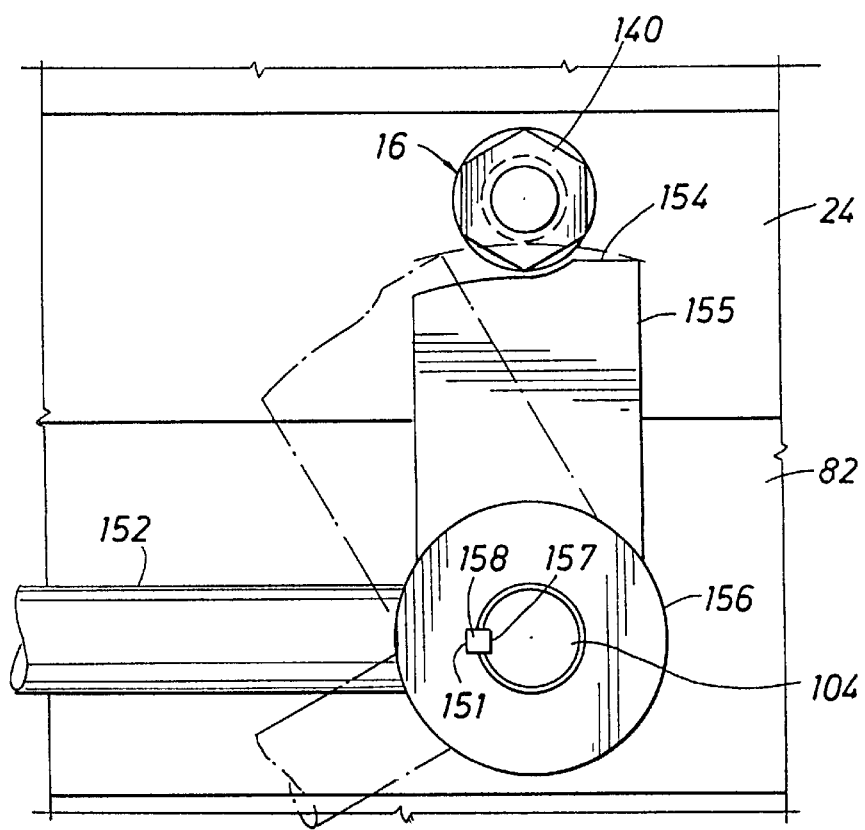
FIG. 4 is a view taken along line 4—4 of FIG. 1 of the internal tank valve safety lock and interlock mechanism, the dashed lines showing the path of travel during unseating of the valve disk.

Referring to FIGS. 1, 4 and 5, an interlocking lug 155 is secured, preferably by welding, to a collar 156. The collar 156 is in turn secured to the shaft 104 of the valve operator 14 in a manner that will prevent relative rotation or translation along the shaft 104. Referring to FIG. 1, one such means for accomplishing this is by using a key 158 (FIG. 4) received in a keyway 151 in the collar 156 and in a key slot 157 in the valve operator shaft 104. Preferably, an operating handle 152 is also connected to the collar 156 to form a lever for rotating the operator shaft 104 as will be explained below. The alignment of the installed collar 156 on the valve operator shaft 104 should be such that when the valve operator 14 is in the fully closed position, a lock portion 154 of the interlocking lug 155 is in contact or near proximity with the head 140 of the safety lock pin 136. Rotation of the valve operator 14 should be such that the lock portion 154 passes by, rather than away from, the head 140. The lock portion 154 of interlocking lug 155 is sized and shaped to allow rotation without contacting the shaft of the safety lock pin 136 when the safety lock pin 136 has been rotated to an unlocked position. Conversely, the lock portion 154 is sized and shaped to prevent rotation of the lock portion 154 past the exterior head 140 when the safety lock pin 136 is in the locked portion as shown in FIGS. 1 and 5. The interlocking lug 155 should be a radial distance along valve operator shaft 104 from the centerline of the valve that when locking lug 132 is receiving any part of safety lock pin 136, interlocking lug 155 prevents rotation of the valve operator shaft 104 due to contact with exterior head 140. As shown in FIG. 5, when safety lock pin 136 is clear of locking lug 132, exterior head 140 is a sufficient radial distance from the valve centerline to allow interlocking lug 155 to pass inside exterior head 140 upon rotation using valve operator 14.

The operation of the internal tank car valve with safety lock 10 will now be described with specific reference to FIGS. 1–4. FIGS. 1 and 2 show the tank valve assembly 10 in the closed and locked position. The tank valve assembly 10 is closed by rotating the operator shaft 104 via the operating handle 152 (to the position shown in FIG. 4) to bring the curved actuating link 120 of the operator linkage assembly 110 in close relationship to the operator shaft as shown in FIGS. 1 and 2. In the closed position the valve actuating pin 122 is retracted so as not to exert any axial force on the valve disk 52. The compression spring 80 exerts an axial force against the valve disk 52 causing the seal face 60 to seal with the valve seat 34 and close the main valve 12. With the main valve 12 in the closed position, the safety lock pin 136 is threadedly advanced in the radial bore 38 of the mounting adapter 24 so that the safety lock pin 136 extends through the locking bore 134 of the locking lug 132 to lock the main valve 12 in the closed position. In the locked position, sealant may be injected through the sealant groove 142 of the safety lock pin 136 to further ensure against leakage. Further, with reference to FIG. 4, it can be seen that the lock portion 154 of the interlocking lug 155 does not interfere with the threaded advancement of the safety lock pin 136 when the valve is in the closed position.

It is to be understood that the tank valve assembly 10 includes a shear plane 150 at the junction of the base member 82 to the valve body 28. Thus, in the case of an accident or derailment, the tank valve assembly 10 can have the base member 82 with the valve operator 14 sheared off without affecting the integrity of the safety lock 16 and its retention of the main valve 12 in the closed and locked position. Since the valve operator actuating pin 122 is not attached to the valve disk 52, the valve operator 14 is free to separate from the valve disk 52 without affecting the seal between the valve disk 52 and the valve seat 34.

The tank valve assembly 10 is unlocked by rotating the safety lock pin 136 to retract the safety lock pin 136 from the locking bore 134 of the locking lug 132. With the shipping cap 126 removed from the lading outlet 88 of the base member 82, the operator shaft 104 is rotated via the operating handle 152 to cause the valve actuating pin 122 to unseat the valve disk 52 from the valve seat 34 by compressing the compression spring 80. The lading flows through the windows 50 in the guide tube 30 and between the valve disk 52 and the valve seat 34. The lading continues to flow through the lading throughbore 32, the lading passageway 86, and the lading outlet 88.

Operation of the internal tank car valve shown in FIGS. 5 and 6 is slightly different than operation of the valve in FIGS. 1–3. In this embodiment, the actuating pin 122' is in constant contact with valve disk 52'. As a result, the actuating pin 122' exerts axial force on the valve disk 52' in both directions. When spring 80 is used in conjunction with shear planes that allow base member 82 and valve operator 14 to be sheared off without affecting the integrity of the remainder of the valve, spring 80 does supply enough force to cause seal face 60' to seal with the valve seat 34 and close the main valve. In all other respects, the operation of the valve in FIGS. 5 and 6 is similar to the operation of the valve in FIGS. 1–3.

It is contemplated that the safety lock pin 136 could include other designs than the design shown in the drawings. The main requirement is that the safety lock pin 136 prevent inadvertent unseating of the valve disk from the valve seat. Thus, the safety lock pin 136 may include threads requiring rotation to advance or retract the pin from the locking lug 132 or may be a smooth shaft which is pushed and pulled. Additionally, it is to be understood that the safety lock pin 136 may include various types of sealing configurations using seals, as for example O-rings, to prevent the escape of lading through the radial bores 38 and 40.

While not shown in the drawings, it is to be understood that two or more safety locks 16 could be used with the tank valve assembly 10, 10' of the present invention, provided that one is designated as the primary safety lock to which the interlock is tied.

It is further contemplated that interlocks could be designed to be used in conjunction with a number of operator mechanisms other than the mechanism shown in the drawings. The main requirement is that the interlock mechanism prevent the valve operator assembly from exerting force on the valve disk because it is this force that may result in failure of the locking mechanism. For instance, in valves using wheel/drum and wire operators (see U.S. Pat. No. 5,931,444), an interlock mechanism may relieve tension in the wire by deactivating a ratchet clutch when the lock mechanism is in the locked position. In light of this disclosure, motivation to employ available interlock technology to prevent failure of the locking mechanism should be obvious to one skilled in the art.

The foregoing disclosure and description of the invention are illustrative and explanatory thereof, and various changes in the details of the illustrated apparatus and construction and method of operation may be made without departing from the spirit of the invention.

What is claimed is:

1. A valve assembly for a vessel having an opening, the valve assembly comprising:
    a body assembly mounted to the vessel opening, said body assembly having a valve seat and a valve throughbore;
    a valve disk co-acting with said valve seat for opening and closing said valve throughbore;
    a valve operator assembly in cooperative relationship with said valve disk, said valve operator assembly capable of forcing said valve disk away from said valve seat to open said valve throughbore;
    a means for locking said valve disk in said valve seat such that said throughbore is maintained in a closed position;
    a projection rigidly secured to said valve operator assembly for preventing movement of said valve operator assembly when said locking means is in the closed position;
    wherein said locking means comprises:
        a receiver member extending from said valve disk, said receiver member having a receiving portion; and
        a lock member mounted in said body assembly, said lock member capable of being received in said receiver portion to lock said valve disk in a locked position restricting movement of said valve disk relative to said valve seat, said lock member further interacting with said projection, said interaction of said lock member with said projection limiting the range of said valve operator assembly as a consequence of said rigid fastening,
    wherein in said locked position said lock member impedes the range of motion of said valve operator assembly through interaction with said projection.

2. The valve assembly of claim 1, wherein said projection is a plate with rectangular cross-section.

3. A valve assembly for a vessel having an opening, the valve assembly comprising:
    a body assembly mounted to the vessel opening, said body assembly having a valve seat and a valve throughbore;
    a valve disk co-acting with said valve seat for opening and closing said valve throughbore;
    a valve operator assembly in cooperative relationship with said valve disk, said valve operator assembly capable of forcing said valve disk away from said valve seat to open said valve throughbore;
    a means for locking said valve disk in said valve seat such that said throughbore is maintained in a closed position; and
    a projection rigidly secured to said valve operator assembly for preventing movement of said valve operator assembly when said locking means is in the closed position, said interaction of said locking means with said projection limiting the range of said valve operator assembly as a consequence of said rigid fastening.

4. The valve assembly of claim 3, wherein said locking means has both open and closed positions for maintaining said throughbore in corresponding open and closed positions.

5. The valve assembly of claim 3, wherein said locking means comprises:
    a receiver member extending from said valve disk, said receiver member having a receiving portion; and
    a lock member mounted in said body assembly, said lock member capable of being received in said receiver portion to lock said valve disk in a locked position restricting movement of said valve disk relative to said valve seat.

6. The valve assembly of claim 5, wherein in said locked position said lock member impedes the range of motion of said valve operator assembly through interaction with said projection.

7. The valve assembly of claim 5, wherein said lock member includes a threaded portion which engages a threaded bore in said body assembly.

8. The valve assembly of claim 3, wherein said projection is a plate with rectangular cross-section.

9. A valve assembly for a vessel having an opening, the valve assembly comprising:
    a body assembly mounted to the vessel opening, said body assembly having a valve seat and a valve throughbore;
    a valve disk co-acting with said valve seat for opening and closing said valve throughbore;
    a receiver member extending from said valve disk, said receiver member having a receiver portion;
    a lock member mounted in said body assembly, said lock member capable of being received in said receiver portion to lock said valve disk in a locked position restricting movement of said valve disk relative to said valve seat;

a valve operator assembly in cooperative relationship with said valve disk, said valve operator assembly capable of forcing said valve disk away from said valve seat to open said valve throughbore when said lock member is in an unlocked position; and an interlock lug rigidly attached to said valve operator assembly, said interlock lug preventing movement of said valve operator assembly when said lock member is in the locked position.

10. The valve assembly of claim 9, wherein in said locked position said lock member impedes the range of motion of said valve operator assembly through interaction with said interlock lug.

11. A valve assembly for a tank having an opening, the valve assembly comprising:

a body assembly mounted to the tank opening, said body assembly having a valve seat and a valve throughbore;

a valve disk co-acting with said valve seat for opening and closing said valve throughbore;

a locking lug attached to said valve disk, said locking lug having a locking bore;

a lock pin mounted in said body assembly, said lock pin having a locked position preventing opening of said valve throughbore and an unlocked position, said lock pin being received in said locking bore to lock said valve disk in the locked position, and said lock pin being withdrawn from said locking bore in the unlocked position;

a valve operator assembly mounted in said body assembly for opening and closing said valve throughbore;

an interlock lug co-acting with said lock pin so as to prevent operability of said valve operator assembly when said lock pin is in the locked position; and said body assembly including a first member and a second member and having a shear plane formed between said first and second members, wherein said second member may shear, along with said valve operator and said interlock lug, from said first member at said shear plane without affecting the integrity of said lock pin in the locked position.

12. The valve assembly of claim 11, wherein said lock pin impedes the range of motion of said valve operator assembly through interaction with said interlock lug only when said lock pin is in a locked position.

* * * * *